United States Patent [19]

Anthonsen

[11] Patent Number: 5,087,082
[45] Date of Patent: Feb. 11, 1992

[54] ROTARY JOINT

[75] Inventor: Niels A. Anthonsen, West Vancouver, Canada

[73] Assignee: Indu-Tech Enterprises Ltd., British Columbia, Canada

[21] Appl. No.: 450,196

[22] Filed: Dec. 13, 1989

[30] Foreign Application Priority Data

Dec. 13, 1988 [CA] Canada .................. 585,823

[51] Int. Cl.⁵ .............................. F16L 27/00
[52] U.S. Cl. ........................... 285/94; 285/41; 285/98; 285/122; 285/279; 285/281
[58] Field of Search ............. 285/38, 41, 94, 98, 285/122, 108, 276, 281, 279, 267; 277/57

[56] References Cited

U.S. PATENT DOCUMENTS

| | | | |
|---|---|---|---|
| 835,836 | 11/1906 | Schulz | 277/57 |
| 2,230,881 | 2/1941 | Browne | 285/41 X |
| 2,384,281 | 9/1945 | Carter | 285/94 X |
| 2,425,211 | 8/1947 | Strickland | 285/41 |
| 2,626,166 | 1/1953 | Fawick | 285/94 X |
| 2,693,373 | 11/1954 | Tremolada | 285/94 X |
| 2,701,146 | 2/1955 | Warren | 285/134 |
| 2,877,026 | 3/1959 | Payne et al. | 285/108 X |
| 3,167,332 | 1/1965 | Simmers . | |
| 3,259,442 | 7/1966 | Boghosian . | |
| 3,396,975 | 8/1968 | Otto | 277/38 X |
| 3,420,555 | 1/1969 | Faccou . | |
| 3,434,742 | 2/1969 | Swinney | 285/94 X |
| 3,833,273 | 9/1974 | Rickley et al. . | |
| 3,841,643 | 10/1974 | McLean | 277/57 |
| 3,843,065 | 10/1974 | Horstman et al. | 277/57 X |
| 3,894,741 | 7/1975 | McHugh . | |
| 3,940,153 | 2/1976 | Stocker | 277/57 |
| 4,071,255 | 1/1978 | Salter, Jr. . | |
| 4,323,268 | 4/1982 | Wilson | 285/41 |
| 4,326,736 | 4/1982 | Kusumi et al. | 285/98 |
| 4,428,586 | 1/1984 | Romero | 277/38 X |
| 4,585,236 | 4/1986 | Simmons et al. . | |
| 4,683,628 | 8/1987 | Schönemann | 29/116.1 |

FOREIGN PATENT DOCUMENTS 1113291  5/1968  United Kingdom .

Primary Examiner—Peter M. Cuomo
Assistant Examiner—Tim Aberle
Attorney, Agent, or Firm—Nilsson, Robbins, Dalgarn, Berliner, Carson & Wurst

[57] ABSTRACT

This invention is directed to a novel rotary joint or coupling which is useful for coupling a rotating element to a non-rotating element. More particularly, this invention is directed to a novel rotary joint or coupling which couples a rotating element to a non-rotating element and allows for the passage of a process fluid from the rotating element to the non-rotating element or vice versa, and seals the flowing process fluid from the external environment. A rotary joint useful for connecting a stationary object to a rotating object comprising: (a) bearing housing adapted to be joined to either the rotating or the stationary object; (b) fluid conveying conduit adapted to be joined to either the stationary or rotating object to which the bearing housing is not joined; (c) sealing member positioned between the fluid conveying conduit and the bearing housing for preventing migration of fluid from the fluid conveying conduit into the bearing housing; and (d) rotatable bearing positioned between the bearing housing and the fluid conveying conduit and exterior to the sealing member, said rotatable bearing being lubricated and cooled by a lubricating substance.

17 Claims, 2 Drawing Sheets

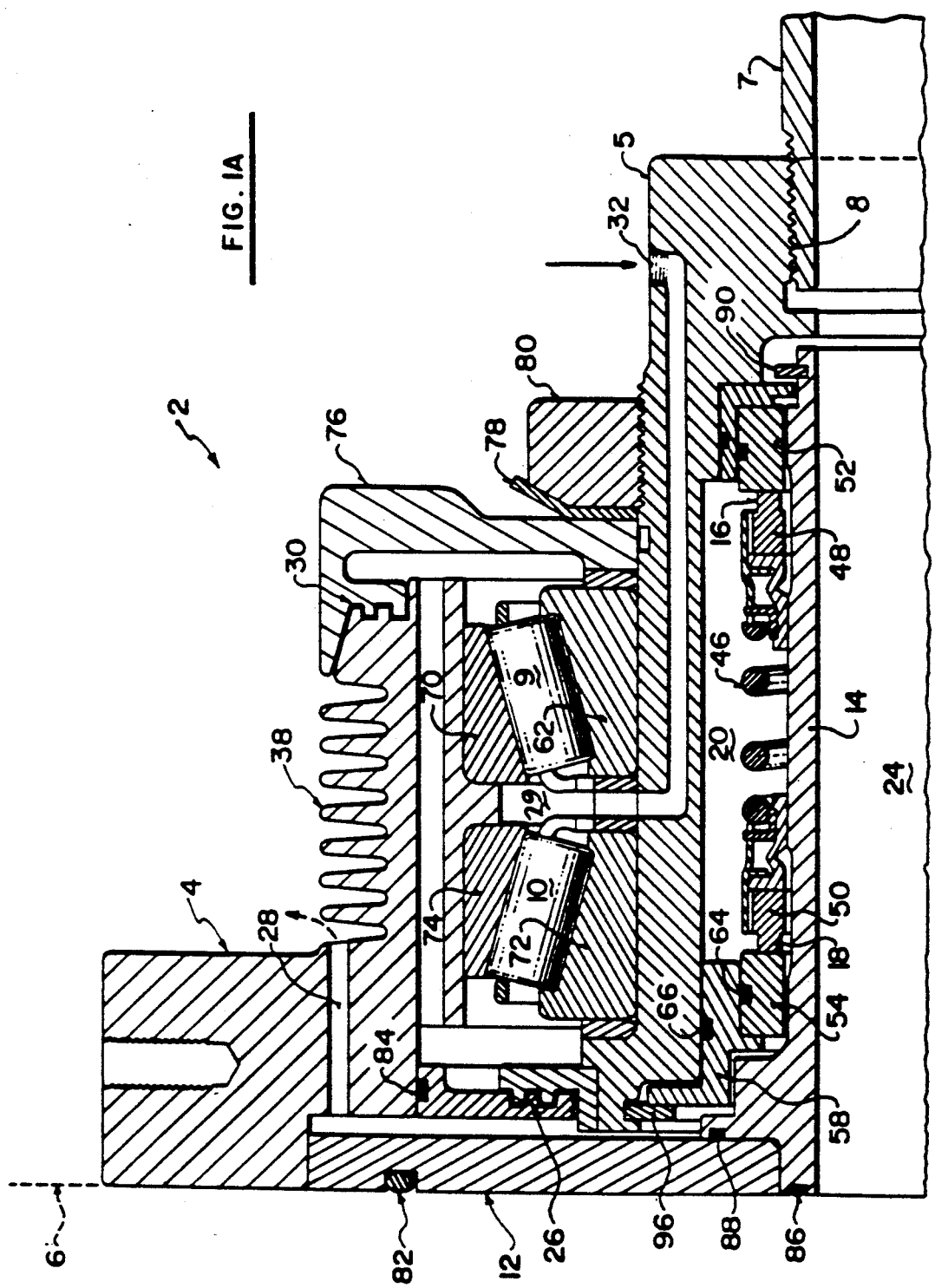
FIG. IA

ROTARY JOINT

FIELD OF THE INVENTION

This invention is directed to a novel rotary joint or coupling which is useful for coupling a rotating element to a non-rotating element. More particularly, this invention is directed to a novel rotary joint or coupling which couples a rotating element to a non-rotating element and allows for the passage of a process fluid from the rotating element to the non-rotating element or vice versa, and seals the flowing process fluid from the external environment.

BACKGROUND OF THE INVENTION

The problem of coupling a rotating element to a non-rotating element while permitting a fluid to pass from one element to the other without leakage has been a challenging engineering problem for many years. The problem is amplified when high temperatures or high process fluid pressures are encountered.

Numerous solutions to this fundamental engineering problem have been proposed over the years and many rotary joints, couplings or seals have been invented and utilized in industry.

Calender rolls operating at high speeds, high temperatures and high pressures for pressing paper in pulp and paper mills present a problem of this nature together with other problems. Heating water is passed through the calender rolls at pressures up to 300 psi and at temperatures up to 450 deg. F. The calender rolls rotate at high speed pressing and ironing the continuous paper sheet that passes between the rolls. Lumps are often present in the paper sheet and cause the rolls to separate suddenly and impact together suddenly. This causes shock waves to be generated and transmitted to the rolls and any equipment attached to the rolls. The pipes transmitting heating fluid to and from the calender rolls are stationary. Many designs of rotary joints or couplings have been developed over the years for the purpose of connecting the stationary pipes to the rapidly rotating calender rolls, while conducting heating fluid through the calender rolls. Notwithstanding the technology that has been developed in this area over the years, it is common for such rotary joints or couplings to begin to leak two to three months after installation from seal breakage due to shock transmission. In the higher temperature cases, the bearings in the rotary joints seize from seal breakage that occurs due to impact shock. The bearings on the rotary joints must then be replaced.

A number of patents disclose rotary couplings or joints which are representative.

U.S. Pat. No. 3,833,273, Rickley et al., granted Sept. 3, 1974, discloses, in a rolling mill, an interlocking labyrinth-type seal for a roll neck which is rotatably supported in a chock assembly. The seal includes an inner first sealing element which rotates with the roll neck, an outer second sealing element which is fixed in relation to the chock assembly, and a third sealing element which is carried on and movable axially along one or the other of the first or second sealing elements. The sealing elements have axially and/or radially spaced flanges and surfaces which cooperate to define an interlocking sealing labyrinth for preventing the escape of lubricating oil from the bearing, while at the same time preventing the bearing and lubricating oil from becoming contaminated with rolling lubricant cooling water, mill scale, dirt, and the like.

U.S. Pat. No. 4,071,255, Salter, Jr., granted Jan. 31, 1978, discloses a flexible seal element with a reinforced drain labyrinth for use on the outer seal ring of a seal assembly located between a roll end face and a bearing chock in a rolling mill, particularly the bearing chocks of the upper backup roll and the work rolls in a four-high mill. The seal element has a circular body portion adapted to tightly surround the outer seal ring. A first circular lip extends outwardly away from the body portion at an angle relative to the axis thereof to frictionally contact the roll end face. The seal body has a drain opening which is arranged to be aligned radially with a drainage port in the outer seal ring. The drain opening is protected by a second lip which extends outwardly from the seal body in a direction opposite to that of the first mentioned lip. A relatively stiff baffle member is attached to the seal body at a location spaced radially inwardly from the second lip. The baffle member and the second lip cooperate in providing a reinforced drain labyrinth which effectively prevents cooling water, mill scale, and the like, from being centrifugally directed upwardly into the bearing from the rotating surfaces of underlying rolls.

U.S. Pat. No. 4,585,236, Divirgilio, granted Apr. 29, 1986, discloses a circular coolant seal which has a base flange arranged in a base plane perpendicular to the seal axis. A flexible resilient sealing flange is integrally joined at one edge to the base flange and terminated at its opposite edge in a sealing lip located in a sealing plane parallel to and spaced axially from the base plane. The sealing lip has a first portion extending from the base flange angularly away from the base plane and inwardly towards the seal axis to an intermediate hinge portion, and a second portion extending from the hinge portion away from the seal axis and angularly towards the sealing plane. The configuration, flexibility and resilience of the sealing flange is such that axial displacement of the sealing lip in relation to the base flange is accompanied by both axial and radial displacement of the hinge portion.

U.S. Pat. No. 3,167,332, Simmers, granted Jan. 26, 1965, discloses an apparatus for cooling trunnions and bearings for converters in steel mills wherein a large quantity of heat is generated. The device is specifically directed to cooling a trunnion, its journal and bearing, which has no readily accessible open end to which a conventional cooling system may be attached.

U.S. Pat. No. 3,259,442, Boghosian, granted July 5, 1966, discloses a seal for use in a rolling mill and more particularly to a means of preventing contamination of roll neck bearings by foreign matter such as cooling water, mill scale, dust, and the like, while at the same time, preventing loss of lubricating oil from the bearing chocks.

SUMMARY OF THE INVENTION

A rotary joint useful for connecting a stationary object to a rotating object comprising: (a) bearing housing means adapted to be joined to either the rotating or the stationary object: (b) fluid conveying means adapted to be joined to either the stationary or rotating object to which the bearing housing means is not joined; (c) sealing means positioned between the fluid conveying means and the bearing housing means for preventing migration of fluid from the fluid conveying means into the bearing housing means; and (d) rotatable bearing means positioned between the bearing housing means and the fluid conveying means, and exterior to the sealing means, said bearing means being lubricated by a lubricating means.

A rotary joint for connecting a stationary object to a rotating object comprising: (a) bearing housing means adapted to be joined to either the stationary or rotating object; (b) fluid conveying means adapted to convey a first fluid and to be joined to either the stationary or rotating object that is not joined to the bearing housing means and adapted to rotate independently of the bearing housing means; (c) rotatable sealing means positioned between the bearing housing means and the fluid conveying means for enabling the bearing housing means and the fluid conveying means to rotate independently and preventing migration of fluid from the fluid conveying means to the bearing housing means; (d) first cavity means enclosing the rotatable sealing means and being adapted to have circulated therethrough a second fluid different from and independent of the first fluid being conveyed by the fluid conveying means; (e) rotatable bearing means positioned in the bearing housing means and on the side of the rotatable sealing means opposite the fluid conveying means, said rotatable bearing means being adapted to enable the bearing housing means and the fluid conveying means to rotate independently of one another and; (f) a second cavity means enclosing the rotatable bearing means, the second cavity being independent of the first cavity means and being adapted to have circulated therethrough a lubricating means different from the first and second fluids.

DRAWINGS

In a drawing which illustrates a specific embodiment of the invention, but which should not be construed as limiting or restricting the spirit or scope of the invention in any way:

FIGS. 1A and 1B illustrate upper and lower side elevation section views of the rotary joint.

DETAILED DESCRIPTION OF A SPECIFIC EMBODIMENT OF THE INVENTION

Figure 1B:
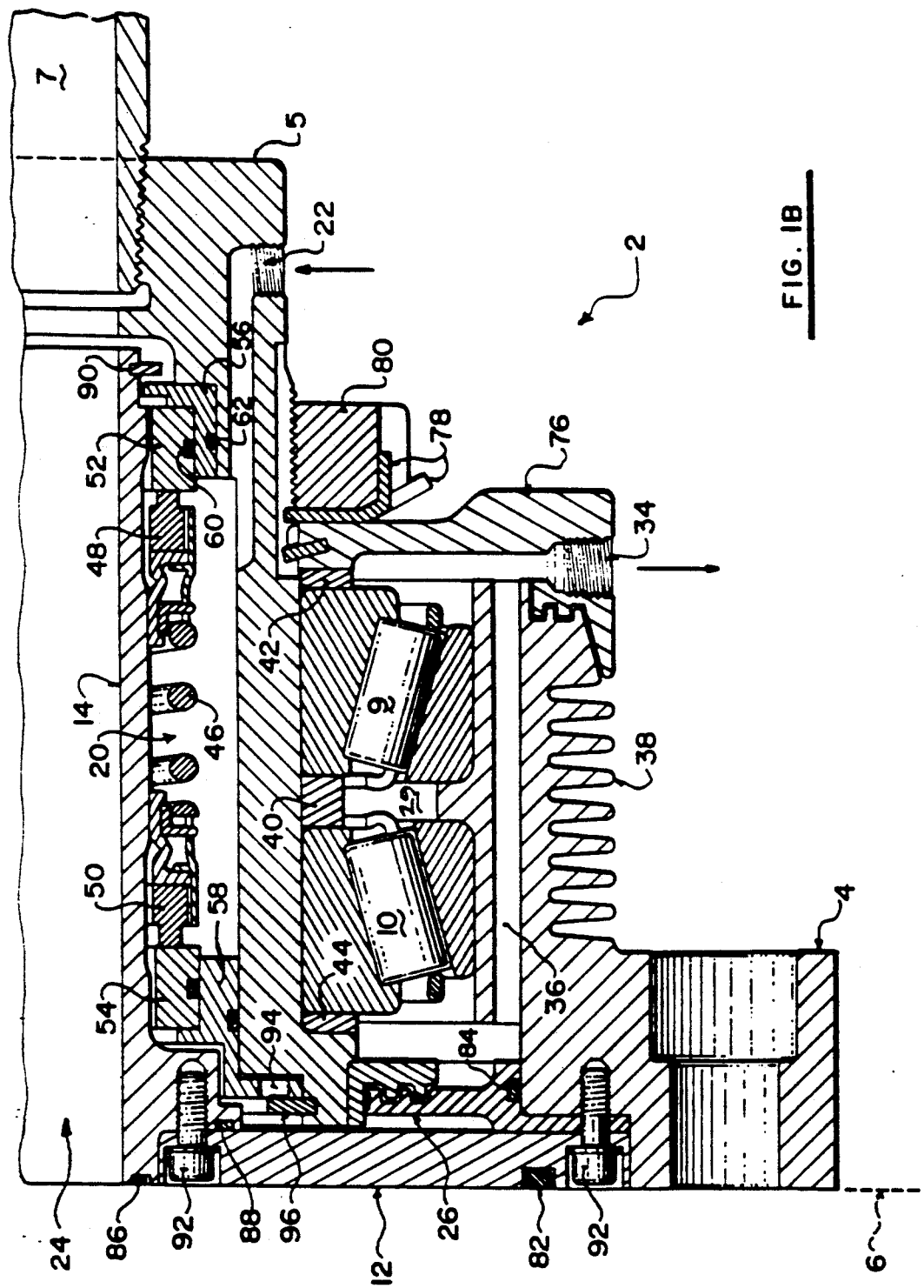

FIGS. 1A and 1B illustrate upper and lower side elevation section views of a rotary joint 2 or coupling which contains seals rotary joint is used to couple a rotating element to a non-rotating element and allows for the passage of a process fluid, such as a heating fluid, from one element to the other. The fundamental purpose of the rotary joint is to seal the process fluid flowing through the centre of the rotary joint from leaking to the external environment while at the same time protecting the bearings both from leakage and the heat of the process fluid and any internal or external contamination that might attempt to invade the bearings. The bearings and mechanical seals used in the rotary joint are conventional and can be purchased from any one of numerous manufacturers.

The rotary joint 2 is constructed principally of a bearing housing 4 and a bearing tube 5. The bearing housing 4 is typically bolted to a rotating calender roll 6 and the bearing tube 5 is attached to a process fluid conveying pipe 7 by a threaded connection 8. The bearing housing 4 and bearing tube 5 are coupled to each other by two taper roller bearings 9 and 10 which allow the bearing housing 4 to rotate relative to the bearing tube 5 while maintaining an axially rigid assembly. While FIGS. 1A and 1B depict taper roller bearings 9 and 10, it will be understood that other suitable types can be used.

A seal tube 14 is attached to the bearing housing 4 by a back plate 12. A double mechanical seal consisting of an outboard seal 16 and an inboard seal 18 is mounted on the seal tube 14 and is located diametrically inside a large portion of the inner surface of the bearing tube 5. These seals 16 and 18 are located in a seal cavity 20 which is defined by the inner diameter surface of the bearing tube 5 and the outer diameter surface seal tube 14. It will be noted that the seal tube 14 is recessed slightly under both the inboard and outboard seal areas to provide some deflection room when the seal encounters a shock and deflects momentarily. Thus the seal 16, 18 does not impinge against the inner surface of seal tube 14 and break. The inboard seal 18 and the outboard seal 16 are positioned at each end of cavity 20. A cool fluid lubricant, termed "seal water", is circulated through seal cavity 20 via seal water in port 22 and out through a seal water out-port (not visible) in the bearing tube 5. The seal water out-port is a conduit leading away from cavity 20 to the exterior of the bearing tube 5. The seal water, besides lubricating the sealing faces of seals 16 and 18, acts as a heat buffer or shield between the hot process fluid (which is passing through conduit 24 created by the interior of bearing tube 5 and seal tube 14) and bearings 9 and 10 by absorbing and removing heat conducted from the process fluid in cavity 24 before the heat reaches the bearings 9 and 10. This feature helps to keep bearings 9 and 10 cool (overheated bearings are a major failure point of conventional rotary joints in high temperature applications) and is believed to represent a novel aspect of the invention. In the event that inboard seal 18 fails, the seal water fluid, because of the intervention of bearing tube 5, seal tube 14 and labyrinth 26, bypasses the bearings 9 and 10 and passes between the back plate 12 and inboard labyrinth 26 to exit hole 28 (see FIG. 1A).

The outboard labyrinth 30 protects the bearings 9 and 10 from external contamination penetrating into the bearing. When oil is used a roller bearings 9 and 10 lubricant, the inboard 26 and outboard labyrinths 30 prevent the oil from flowing out into the environment. Bearing lubricant is introduced into the cavity 29 between the bearings 9 and 10 via the bearing lubricant inport 32 (see FIG. 1A) and exits via bearing lubricant outport 34 (see FIG. 1B). Lubricant migrates to the outport 34 from the cavity 29 between the bearings 9 and 10 via holes 36 (FIG. 1B) in the bearing housing. As seen in FIGS. 1A and 1B bearing housing 4 rotates with the roll 6 while bearing tube 5 remains stationary.

Three bearing spacers are utilized in the embodiment depicted in FIGS. 1A and 1B. The centre spacer 40 (FIG. 1B) allows for adjusting axial and longitudinal play of the bearing tube 5 relative to the bearing housing is conventional. The two outside spacers 42 and 44 (FIG. 1B) can be of various required sizes and allow for a choice to be made between bearings obtainable from different bearing manufacturers whose bearings vary in width.

The rotary joint of the invention represents a strong improvement over known technology in that normally the bearings and seals in a conventional rotary joint are mounted in a line on the same fluid conveying tube. This correlation arrangement provides the heat from the process fluid an easy conduction path through the tube to the bearings thereby causing bearing breakdown.

The construction of the outboard mechanical seal 16 and the inboard mechanical seal 18 is conventional. This facilitates replacement when the seals wear out. The seals 16 and 18 are positioned so that the rotating elements 48 and 50 face away from one another. A coil spring 46 encircles the seal tube 14 and forces the rotating elements 48 and 50 respectively to impinge against respective outboard seal stationary element 52 and inboard seal stationary element 54. The outboard seal stationary element 52 is held in place by outboard seal carrier 56 (see FIG. 1B). Likewise, inboard seal stationary element 54 is held in place by inboard seal carrier 58 (FIG. 1B). O-rings 60 and 62 provide seals between outboard seal stationary element 52, outboard seal carrier 56 and the inside of the outboard surface of bearing tube 5.

Likewise, O-rings 64 and 66 (see FIG. 1A) provide seals between inboard seal stationary element 54, inboard seal carrier 58, and the inside of the inboard surface of bearing tube 5. As a general rule, the O-rings are located at the centre of mass axis for each component. This prevents the respective components from attempting to "tip" when the joint is subjected to a shock wave. Any tipping action could cause damage to each part. Outboard taper roller bear rolls between inner race 62 and outer race 70 (see FIG. 1A). Similarly, inboard taper roller bearing 10 rolls between inner race 72 and outer race 74 (FIG. 1A). Outboard taper bearing 9 and inboard taper bearing 10, together with ancillary elements, are enclosed by front cover 76, which mates with the outboard face of bearing housing 4 and forms the outboard face of outboard labyrinth 30. Front cover 76 is held in place by bearing lock washer 78 and bearing lock nut 80. Access to outboard bearing 9 and inboard bearing 10, and ancillary parts, can be gained by removing bearing lock nut 80, bearing lock washer 78, and front cover 76. This is useful when the time comes to service or replace bearings 9 or 10, and ancillary elements.

Cooling of bearing housing 4 is assisted by bearing housing cooling fins 38 in the exterior surface of a portion of the bearing housing 4. O-rings 82, 84, 86 and 88 are used at various joint locations in the rotary joint 2 in order to provide seals against any migrating fluids, and also provide some shock absorbing capacity.

The seal tube 14 and accompanying seals 16 and 18, spring 46, and the like, can be removed and replaced as a unit by a unique combination. Cap screws 92 (usually six or more in number) can be unscrewed to enable back plate 12 to be removed. Then, two or three of the cap screws 92 (see FIG. 1B) can be screwed into two or three extraction holes 94 formed in inboard seal carrier 58 (see FIG. 1B). This applies a force against the bearing tube and draws out the entire sealing unit as one piece. Snap ring 90, which fits in the outboard end of seal tube 14 ensures that the seal elements will not slide off the seal tube 14 as it is withdrawn. A snap ring 96 at the inboard end holds the inboard end of the seal components together.

It is believed that a principal point of novelty of the invention resides in the placement of the bearings away from the heat source, using the seal water circulating through the seal cavity 20 to remove the heat normally transferred to the bearings.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A rotary joint for connecting a stationary object to a rotating object comprising:
   (a) bearing housing means adapted to be joined to either the stationary or rotating object;
   (b) seal housing means adapted to be joined to either the stationary or rotating object that is not joined to the bearing housing means and adapted to rotate independently of the bearing housing means;
   (c) rotatable sealing means positioned in association with the bearing housing means and the seal housing means adapted to enable the bearing housing means and the seal housing means to rotate independently;
   (d) first cavity means enclosing at least in part the rotatable sealing means and being adapted to have circulated therethrough a first fluid;
   (e) rotatable bearing means positioned radially exterior to the first cavity means and in association with the bearing housing means, and being adapted to enable the bearing housing means and the seal housing means to rotate independently of one another and;
   (f) second cavity means enclosing the rotatable bearing means, the second cavity means being radially exterior of the first cavity means and independent of the first cavity means and being adapted to have circulated therethrough a lubricating means different from the first fluid, wherein the seal housing means includes a seal tube which forms one side of the first cavity means, the bearing housing means being positioned radially exterior of the seal housing means and the seal housing means forming in part a radially exterior wall of the first cavity means and the radially interior wall of the second cavity means, and wherein the rotatable bearing means are located between the seal housing means and the bearing housing means and are isolated from the rotatable sealing means and the seal tube, the seal housing means in part and the bearing housing means creating radially interior and exterior walls of the second cavity means.

2. A rotary joint as claimed in 1 wherein the rotatable sealing means comprises a first rotatable seal and a second rotatable seal, the first rotatable seal being located towards and between one end of the seal tube and the seal housing means and the second rotatable seal being located towards and between the opposite end of the seal tube and the seal housing means.

3. A rotary joint as claimed in claim 1 wherein the rotatable bearing means comprise a first bearing and a second bearing, the first bearing being located towards and between one end of the bearing tube and bearing housing means, and the second bearing being located towards and between the opposite end of the bearing tube and the bearing housing means.

4. A rotary joint as claimed in claim 6 wherein first and second removable spacing means are positioned at the respective exterior ends of the first bearing and the second bearing when taken as a unit.

5. A rotary joint as claimed in claim 3 wherein force applying means can be used to cause the first rotatable bearing and the second rotatable bearing to be withdrawing as a unit from the interior of the rotary joint.

6. A rotary joint as claimed in claim 3 wherein the first bearing and the second bearing are taper roller bearings, which comprise rollers rolling between respective inner and outer races.

7. A rotary joint as claimed in claim 6 wherein the lubricating means is a bearing lubricant which is introduced into the second cavity through a port in the bearing tube to a location between the first bearing and the second bearing.

8. A rotary joint as claimed in claim 7 wherein the bearing lubricant exits from the second cavity and the bearing housing means through a port in the bearing housing means.

9. A rotary joint as claimed in claim 8 wherein first and second labyrinth means are formed at either end of the bearing housing means.

10. A rotary joint as claimed in claim 9 wherein one end of the second cavity means containing the first and second bearings is enclosed by means of a removable cover which is removably joined to the bearing housing means, a portion of the mating surface of the removable cover and the bearing housing means forming the first or second labyrinth.

11. A rotary joint as claimed in claim 10 wherein the exterior surface of the bearing housing means has cooling fins.

12. A rotary joint as claimed in claim 1 wherein a port in a stationary part of the joint enables the first fluid which is a seal lubricating fluid to be introduced to the first rotatable seal and the second rotatable seal between the seal housing means and the seal tube.

13. A rotary joint as claimed in claim 12 wherein a coil spring means encircles the seal tube and is located between the first rotatable seal and the second rotatable seal.

14. A rotary joint as claimed in claim 12 wherein the first and second rotatable seals are respectively comprised of first and second independent abutting elements, the respective first elements of the first seal and the second seal are secured to the bearing tube, and the respective second elements of the first seal and the second seal are secured to the seal tube.

15. A rotary joint as claimed in claim 14 wherein the stationary object is a fluid conveying pipe, and the bearing tube is affixed to the pipe.

16. A rotary joint as claimed in claim 15 wherein the rotating object is a calender roll and the bearing housing means is affixed to the calender roll.

17. A rotary joint for connecting a stationary object to a rotating object comprising:
  (a) bearing housing means adapted to be joined to either the stationary or the rotating object;
  (b) seal housing means adapted to be joined to either the stationary or rotating object that is not joined to the bearing housing means and adapted to rotate independently of the bearing housing means;
  (c) seal tube means adapted to cooperate with the bearing housing means, and positioned radially to the interior of the bearing housing means and the seal housing means;
  (d) rotatable sealing means positioned between the seal housing means and the seal tube means and adapted to enable the seal housing means and the seal tube means to rotate independently;
  (e) first cavity means enclosing the rotatable sealing means and being adapted to have circulated therethrough a first fluid, at least a part of the radially interior wall thereof being formed by the seal tube means;
  (f) rotatable bearing means positioned radially exterior to the first cavity means and in association with the bearing housing means and seal housing means, and being adapted to enable the bearing housing means and the seal housing means to rotate independently of one another and;
  (g) a second cavity means enclosing the rotatable bearing means, the second cavity being independent of the first cavity means and being adapted to have circulated therethrough a lubricating means different from the first fluid, wherein the bearing housing means is positioned radially exterior of the seal housing means and the seal housing means forms in part a radially exterior wall of the first cavity and at least a part of the interior radial wall of the second cavity, and wherein the rotatable bearing means are located between the seal housing means and the bearing housing means and are isolated from the rotatable sealing means and the seal tube means, the seal housing means and the bearing housing means creating opposite wall of the second cavity means.

* * * * *